US010585474B2

(12) United States Patent
Azam et al.

(10) Patent No.: US 10,585,474 B2
(45) Date of Patent: Mar. 10, 2020

(54) ELECTRONIC DISPLAY ILLUMINATION

(71) Applicant: Hewlett-Packard Development Company, L.P., Houston, TX (US)

(72) Inventors: Syed S Azam, Tomball, TX (US); Richard E Hodges, Magnolia, TX (US); James Robert Waldron, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 170 days.

(21) Appl. No.: 15/522,011

(22) PCT Filed: Jan. 30, 2015

(86) PCT No.: PCT/US2015/013999
§ 371 (c)(1),
(2) Date: Apr. 26, 2017

(87) PCT Pub. No.: WO2016/122671
PCT Pub. Date: Aug. 4, 2016

(65) Prior Publication Data
US 2017/0329399 A1 Nov. 16, 2017

(51) Int. Cl.
*G06F 1/00* (2006.01)
*G06F 3/01* (2006.01)
(Continued)

(52) U.S. Cl.
CPC ............ *G06F 3/013* (2013.01); *G06F 1/3231* (2013.01); *G06F 1/3265* (2013.01); *G06F 3/017* (2013.01);
(Continued)

(58) Field of Classification Search
CPC ...... G06F 3/013; G06F 1/3231; G06F 1/3265; G06F 3/017; G06F 3/0304;
(Continued)

(56) References Cited

U.S. PATENT DOCUMENTS 6,931,596 B2 * 8/2005 Gutta ...................... G06F 3/011
 345/649
8,115,777 B2 * 2/2012 Jain ........................ G09B 21/00
 345/593
(Continued)

FOREIGN PATENT DOCUMENTS

CN 101578844 11/2009
CN 103765374 4/2014
(Continued)

OTHER PUBLICATIONS

Jason Kennedy, "Software Hack Adds Privacy Filter to Old, Decrepit LCD Screens," Oct. 25, 2011, pp. 1-3, ExtremeTech.
(Continued)

*Primary Examiner* — Aurel Prifti
(74) *Attorney, Agent, or Firm* — HP Inc. Patent Department

(57) ABSTRACT

According to an example, at least one user in proximity to a display is detected with a camera. A primary user and eye gaze are determined. The location of a secondary user relative to the display is calculated, and an active screen area and an inactive screen area based on the eye gaze are determined. A first angle and a first brightness for the active screen area and a second angle and a second brightness for the inactive screen area based on the location of the secondary user are calculated, and focus area boundaries for the active screen area based on the location of the secondary user are calculated. The first angle, the first brightness, and the focus area boundaries are applied to the active screen area, and the second angle and the second brightness are applied to the inactive screen area.

20 Claims, 15 Drawing Sheets

(51) Int. Cl.
  *G06F 3/03* (2006.01)
  *G06F 1/3231* (2019.01)
  *G06F 1/3234* (2019.01)

(52) U.S. Cl.
  CPC ... *G06F 3/0304* (2013.01); *G09G 2320/0626* (2013.01); *G09G 2320/0686* (2013.01); *G09G 2354/00* (2013.01); *G09G 2358/00* (2013.01)

(58) Field of Classification Search
  CPC ... G09G 2320/0626; G09G 2320/0686; G09G 2354/00; G09G 2358/00
  USPC ........ 713/323; 345/156, 647, 589, 645, 204, 345/649; 382/103, 116; 715/765, 771
  See application file for complete search history.

(56) References Cited

U.S. PATENT DOCUMENTS

| | | | |
|---|---|---|---|
| 8,686,981 B2* | 4/2014 | Barnhoefer | H05B 33/0851 345/204 |
| 8,913,004 B1* | 12/2014 | Bozarth | G06K 9/00604 345/156 |
| 8,922,480 B1* | 12/2014 | Freed | G09G 5/00 345/156 |
| 2001/0026248 A1 | 10/2001 | Goren et al. | |
| 2003/0161500 A1* | 8/2003 | Blake | G06K 9/6255 382/103 |
| 2006/0087502 A1 | 4/2006 | Karidis et al. | |
| 2006/0119564 A1 | 6/2006 | Fry | |
| 2009/0273562 A1 | 11/2009 | Baliga et al. | |
| 2010/0275266 A1 | 10/2010 | Jakobson et al. | |
| 2011/0096095 A1* | 4/2011 | Xu | G06F 3/012 345/657 |
| 2011/0206285 A1 | 8/2011 | Hodge et al. | |
| 2012/0019152 A1 | 1/2012 | Barnhoefer et al. | |
| 2012/0243729 A1* | 9/2012 | Pasquero | G06F 3/013 382/103 |
| 2012/0288139 A1 | 11/2012 | Singhar | |
| 2013/0125155 A1* | 5/2013 | Bhagavathy | H04N 21/2343 725/10 |
| 2013/0219012 A1 | 8/2013 | Suresh et al. | |
| 2014/0002586 A1* | 1/2014 | Nourbakhsh | H04N 7/144 348/14.16 |
| 2014/0055429 A1 | 2/2014 | Kwon et al. | |
| 2014/0078164 A1 | 3/2014 | Chan et al. | |
| 2014/0146069 A1* | 5/2014 | Tan | G06F 3/011 345/589 |
| 2014/0168070 A1* | 6/2014 | Jeong | G06F 3/013 345/156 |
| 2014/0201666 A1* | 7/2014 | Bedikian | G06F 3/017 715/771 |
| 2014/0201844 A1 | 7/2014 | Buck | |
| 2014/0240357 A1* | 8/2014 | Hou | G09G 5/373 345/647 |
| 2014/0375698 A1* | 12/2014 | Zhang | G09G 3/2003 345/690 |
| 2015/0029093 A1* | 1/2015 | Feinstein | G01B 21/22 345/156 |
| 2015/0058649 A1* | 2/2015 | Song | G06F 1/3231 713/323 |
| 2015/0062314 A1* | 3/2015 | Itoh | G06F 3/012 348/55 |
| 2015/0095815 A1* | 4/2015 | Malkin | G06F 3/013 715/765 |
| 2015/0153823 A1* | 6/2015 | Wu | G06F 3/005 345/156 |
| 2015/0185875 A1* | 7/2015 | Li | G06F 3/0346 715/765 |
| 2015/0287164 A1* | 10/2015 | Kominar | G06T 3/0093 345/647 |
| 2016/0035310 A1* | 2/2016 | Song | G06F 3/0304 345/156 |
| 2016/0070344 A1* | 3/2016 | Gohl | G06F 3/013 345/156 |
| 2016/0188973 A1* | 6/2016 | Ziaja | G06F 21/84 382/116 |
| 2016/0299574 A1* | 10/2016 | Chen | G09G 5/00 |
| 2017/0264851 A1* | 9/2017 | Kuplevakhsky | G09G 3/20 |

FOREIGN PATENT DOCUMENTS

| | | |
|---|---|---|
| CN | 104137050 | 11/2014 |
| TW | 201306573 A | 2/2013 |
| TW | 201406142 A | 2/2014 |
| WO | WO-2012-162060 A2 | 11/2012 |

OTHER PUBLICATIONS

Justin Germino, "3M Privacy Filter Software Protects Against #VisualHacking," Nov. 14, 2014, pp. 1-5, Dragon Dogger Technology and Entertainment.

* cited by examiner

ELECTRONIC DISPLAY ILLUMINATION

BACKGROUND

Data stored on electronic devices in the consumer, commercial, and industrial sectors often includes data that is associated with varying levels of confidentiality and sensitivity. A user accessing or inputting the private data may need to display the data on an electronic display, such as a desktop computer, laptop computer, or mobile device, while maintaining the required levels of privacy.

DETAILED DESCRIPTION

Figure 1A:
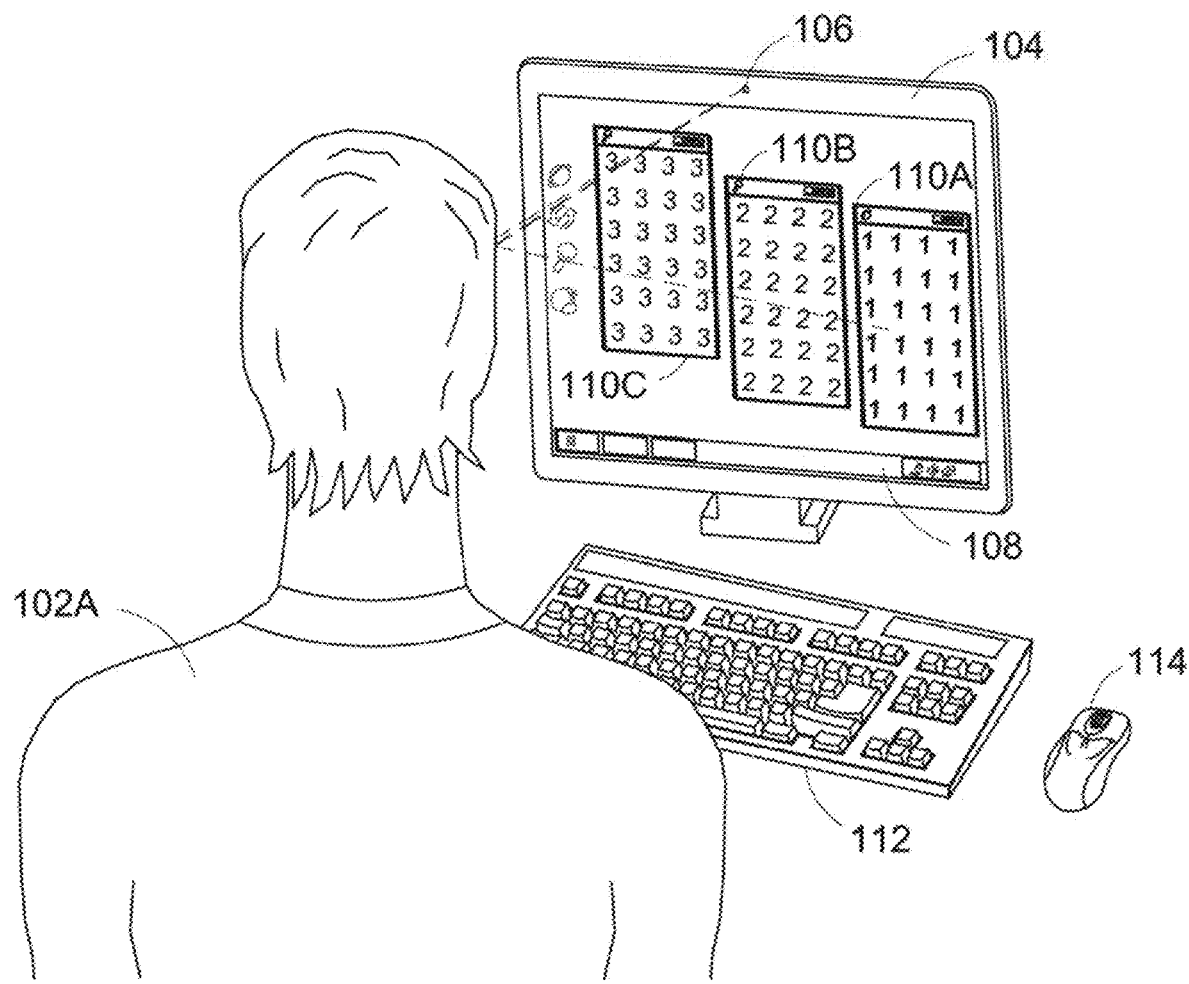
FIGS. 1A-C illustrate a device for adjusting display illumination and privacy based on eye gaze and the location of a secondary user relative to the display, according to an example of the present disclosure.

Various embodiments described below provide for improving display privacy and power management by adjusting the angles, brightness, and focus areas of active and inactive screen areas or windows (herein either "screen areas" or "windows") on an electronic display, and/or powering down all or parts of the display. The changes to the angles, brightness, focus areas, and power states may be determined based on, for example, the eye gaze of an authorized or "primary" user and a privacy or power management level based on the authorized user's location, the location of an unauthorized or "secondary" user, or the absence of a gaze toward the display from the primary user.

Generally, a user of an electronic device such as a desktop computer, laptop computer, tablet, mobile device, retail point of sale device, or other device (hereinafter "device") may require a heightened level of privacy when inputting or accessing certain information. Privacy screens that may be physically applied to the device may obscure the device display, making it difficult to read at all times, and unnecessarily obscuring the display at times when a heightened level of privacy is not required, such as when the user is alone or in a private location.

For example, a user in an office environment may have several windows or screen areas on a display at any given time. In the office environment, the user may not have a need to obscure any of the windows, and may have a "privacy mode" turned off. However, if the user were in another environment, such as on a plane, train, or generally in a public space, the user may wish to obscure certain parts of the screen, and in particular the parts of the screen that the user is not looking at, as determined by the user's eye gaze. In some examples, the inactive parts of the screen may be obscured by changing the angles, brightness, and focus areas of windows or screen areas, thereby providing for increased privacy with minimal negative effect on the usability or workflow of the user.

As another example, in addition to having a privacy mode turned on or off, the user may wish to have varying levels of privacy modes based on location. In the office example, the user may wish to slightly adjust the angles and brightness of screen areas if a secondary user is detected near the display, e.g., by 20%, while in a mobile environment, the user may wish for the adjustments to the angles and brightness to be more pronounced, e.g., by 40%, as users in a mobile environment are less likely to be trusted or authorized users. In some examples, the percentages may be adjusted or relative to ambient lighting in a room or environment.

Moreover, in some examples, the primary user may wish to adjust the angles, brightness, and focus areas of the screen based on the location or distance of a secondary user. For example, if a secondary user is directly over the primary user's shoulder, the primary user may wish to apply the 40% adjustment examples discussed above, while if the secondary user is several feet away, the primary user may wish for lower adjustments, e.g., 20%, to be applied, with the adjustments dynamically changing based on the location of secondary users.

In other examples, for either privacy or power management reasons, the brightness levels for active and inactive screen areas may adjust based on whether the primary user's eye gaze is present or absent.

Figure 1B:
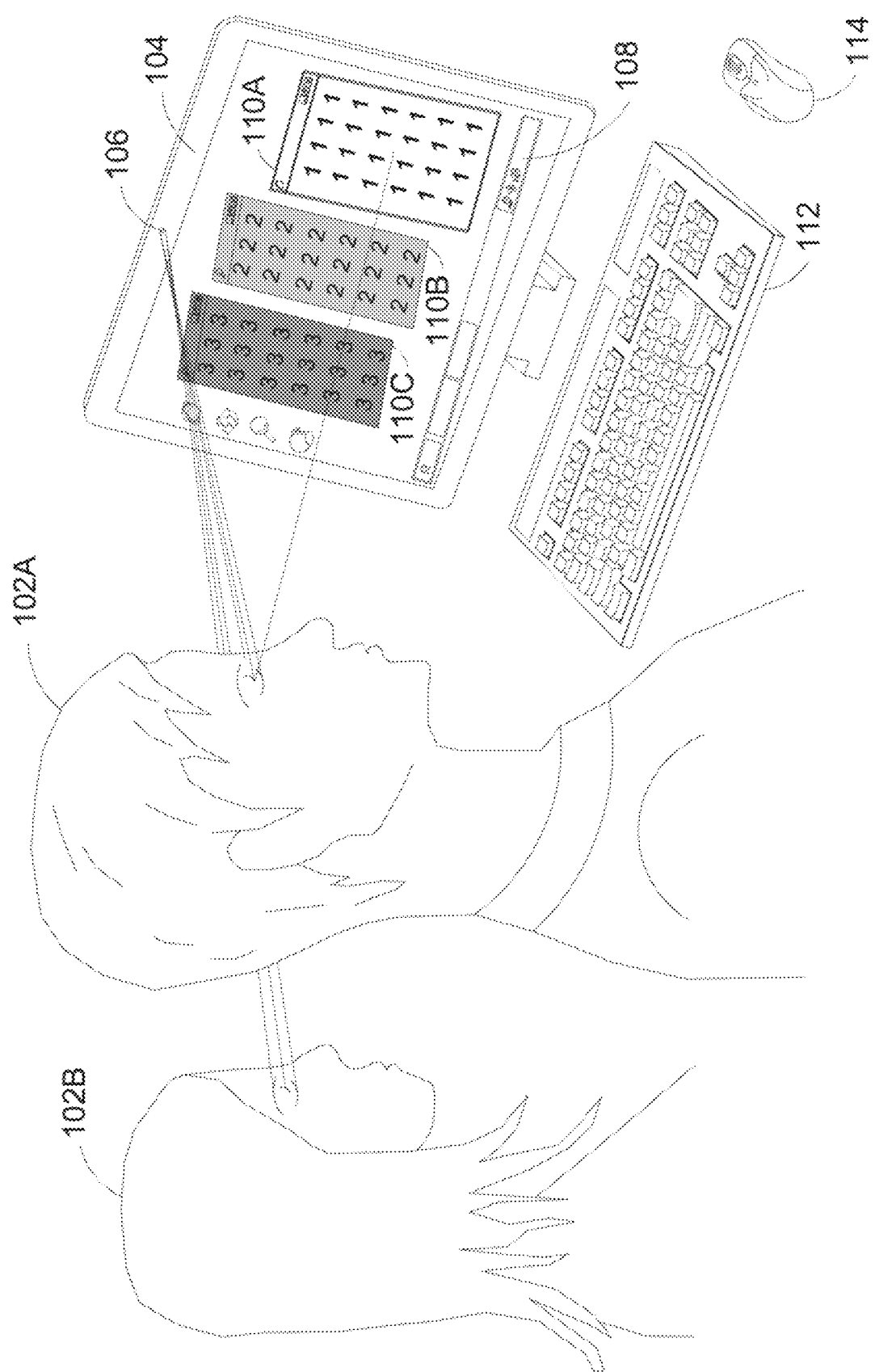
Figure 1C:
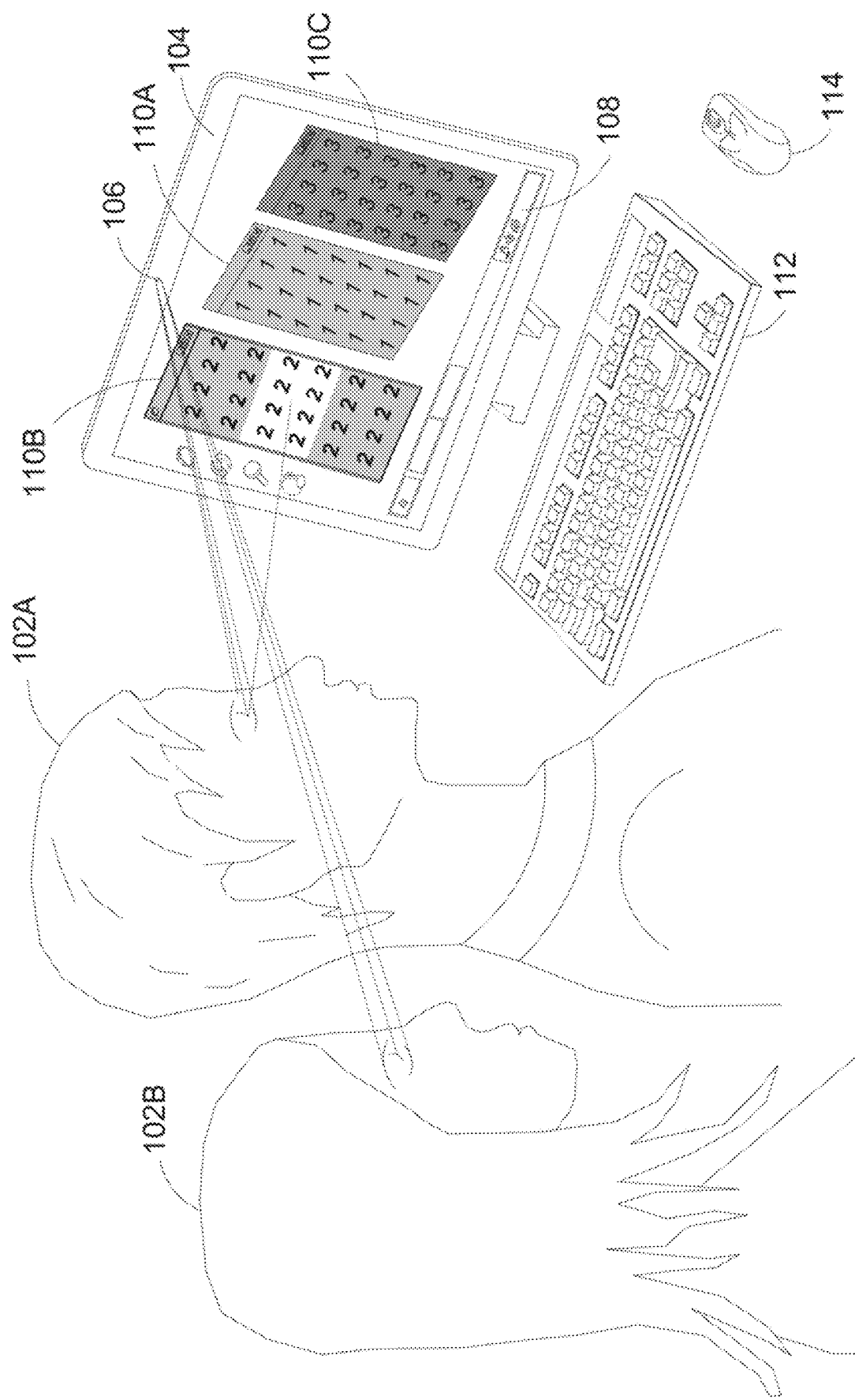

FIGS. 1A-C illustrate a device for adjusting display illumination and privacy based on eye gaze and the location of a secondary user relative to the display, according to an example of the present disclosure In the example of FIG. 1A, a primary or authorized user 102A may be positioned in front of a display 104. Display 104 may display an operating system desktop with a taskbar 108 and windows or screen areas 110A-110C. The display may also be coupled to a keyboard 112 and mouse 114, or other devices or peripherals. Display 104 may also comprise a camera, sensor, LED, or other sensor 106 for detecting a user or users, distances between users and display 104, locations of users, and eye gazes.

In the example of FIG. 1A, user 102A may be detected by sensor 106. Sensor 106 may be, as examples, an HD RGB-IR sensor, an HD RGB (or black and white) CMOS sensor and lens, an IR LED, or any combination of sensors to detect eye gaze. As discussed below in more detail, sensor 106 may detect the location and distance between the display 104 and users, as well as the user's eye gaze, which in the example of FIG. 1A may be positioned toward the lower most window 110A. In the example of FIG. 1A, a privacy mode may be turned off, or no other users may be detected other than a primary or authorized user 102A, such that windows 110A-C are displayed in their original state, without any alterations to their angle, brightness, or focus area.

In the example of FIG. 1B, a second or unauthorized user ("secondary user") 102B may be detected by sensor 106. In an example, sensor 106 or a processing resource on display 104 or elsewhere may determine that user 102A is a primary or authorized user, and that user 102B is not an authorized user. Such determination may be made by, for example, detecting the distance of users 102A and 102B from display 104, and associating the closest user with the role of an authorized user. In other examples, the eye gazes and/or gaze angles of users 102A and 102B may be used, alone or in combination with distance, to determine which user is a primary or authorized user.

In the example of FIG. 1B, once an unauthorized or secondary user has been detected, e.g., user 102B, an angle change or shift to taskbar 108 may be applied to alter the usable viewing angle or perspective such that the taskbar is angled away from, and more difficult to read, for user 102B. Similarly, windows 110A-C may be altered with a change in angle. In various embodiments, taskbar 108 and windows 110A-C may be shifted in angle or perspective or other adjustment to reduce the viewing angle, with the shift occurring in any up, down, left, or right direction; moved, aligned, or cascaded on an x axis; moved back or negatively on a z axis; or shifted in depth of field. Similarly, once an unauthorized user has been detected, the taskbar 108 and/or windows 110A-C may be adjusted to lower levels of brightness.

In some examples, sensor 106 may detect the authorized user's eye gaze and determine which window is active, i.e., which window or screen area the user is looking at on the screen. In such examples, the alterations to angle, brightness, and focus area may be lower for the active window. In the example of FIG. 1B, window 110A where authorized user 102A is gazing may retain an unaltered or high level of brightness and only a slight shift in angle, while the inactive windows where user 102A is not gazing may have lower level of brightness and a higher level of angle shift to impair visibility for secondary user 102B.

The angle of window shift may also be relative to the location or distance of the secondary user. In the example of FIG. 1C, the location of user 102B has shifted from behind and to the left of user 102A over to behind and to the right of user 102A. The angle shift of taskbar 108 and windows 110A-C has shifted accordingly.

In the example of FIG. 1C, the user's eye gaze has also shifted from window 110A to 110B. Also, as the unauthorized user 102B is now closer in distance to authorized user 102A, the usable focus area of window 110B has narrowed to include only two rows of text, with the remainder of window 110B adjusted to a lower level of brightness, e.g., as in windows 110A and 110C. The focus area may be based on a user setting, a fixed length and width, or a percentage of the device display size, alone or in combination with a function based on the distance of the secondary user. For example, the focus are may narrow as the secondary user steps closer to the display 104.

Figure 2A:
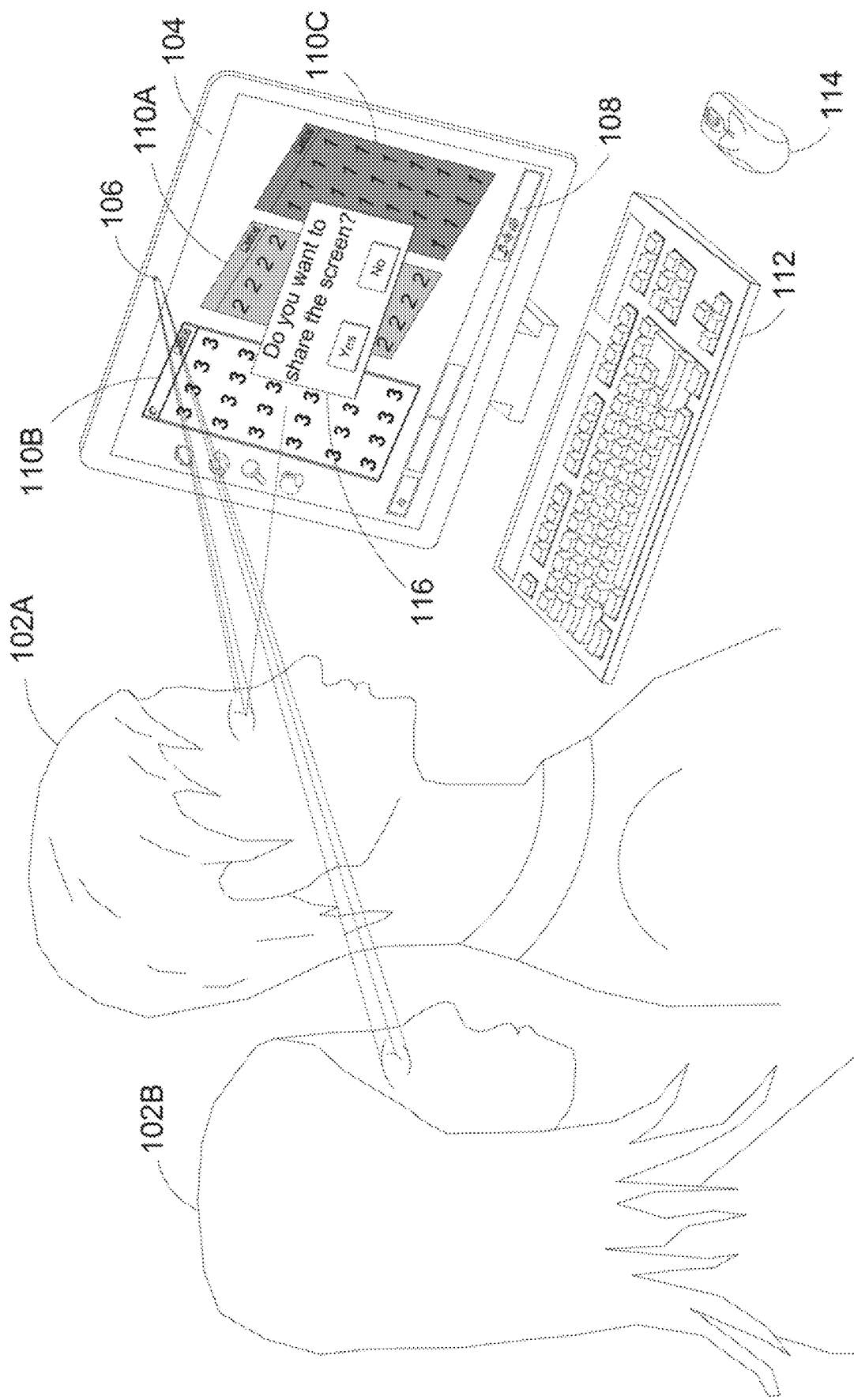
FIGS. 2A-C illustrate a device for adjusting display privacy and illumination with an option to share the display, according to an example of the present disclosure.
Figure 2B:
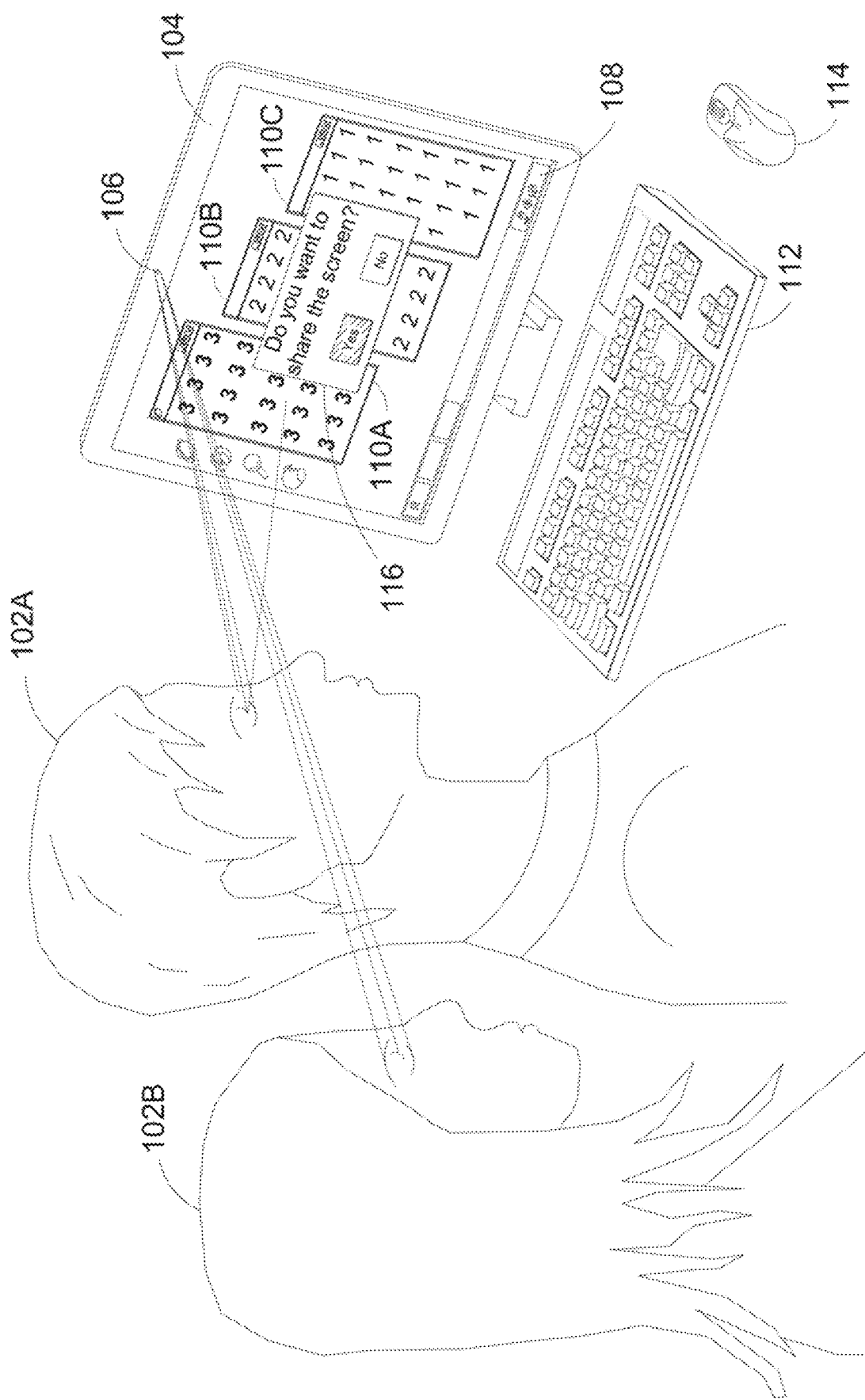
Figure 2C:
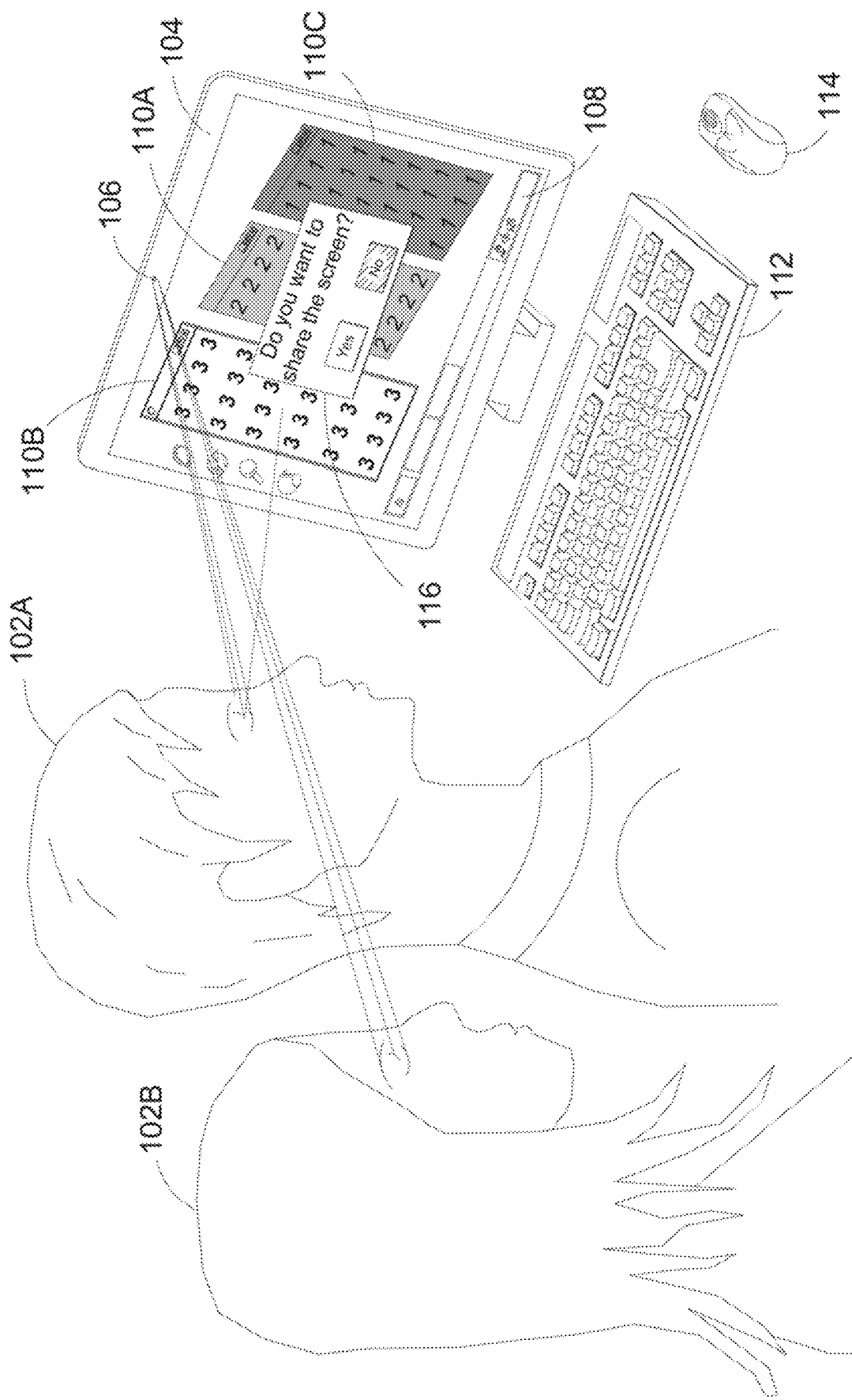

FIGS. 2A-C illustrate a device for adjusting display privacy and illumination with an option to share the display, according to an example of the present disclosure.

In the example of FIG. 2A, after sensor 106 has detected more than one user in proximity to the display, the authorized user 102A is asked whether the authorized user would like to share the screen with prompt 116. In various examples, the user may decide to share or not share the screen by a mouse click, keyboard shortcut, voice command, or other input which may be a discreet action.

In the example of FIG. 28, the authorized user 102A has elected to share the screen. Accordingly, the taskbar 108 and windows 110A-C have returned to their normal state, i.e., any angle, brightness, or focus area adjustments have been removed.

In the example of FIG. 2C, the authorized user 102A has elected to not share the screen. Accordingly, the taskbar 108 and windows 110A-C remain in their altered state, i.e., any angle, brightness, or focus area adjustments have been retained.

Figure 3A:
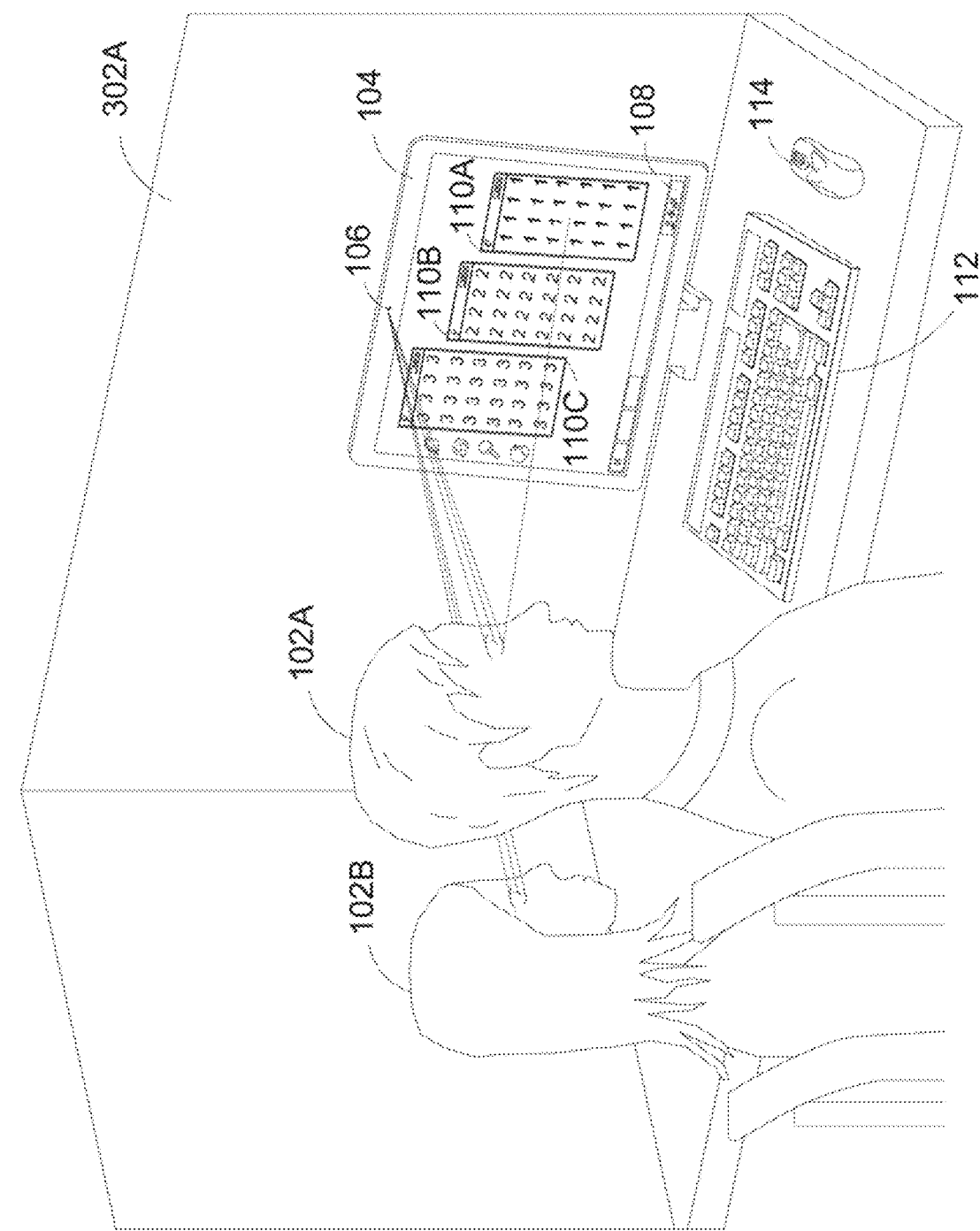
FIGS. 3A-B illustrate a device for adjusting display illumination and privacy based on eye gaze and the location of the display, according to an example of the present disclosure.
Figure 3B:
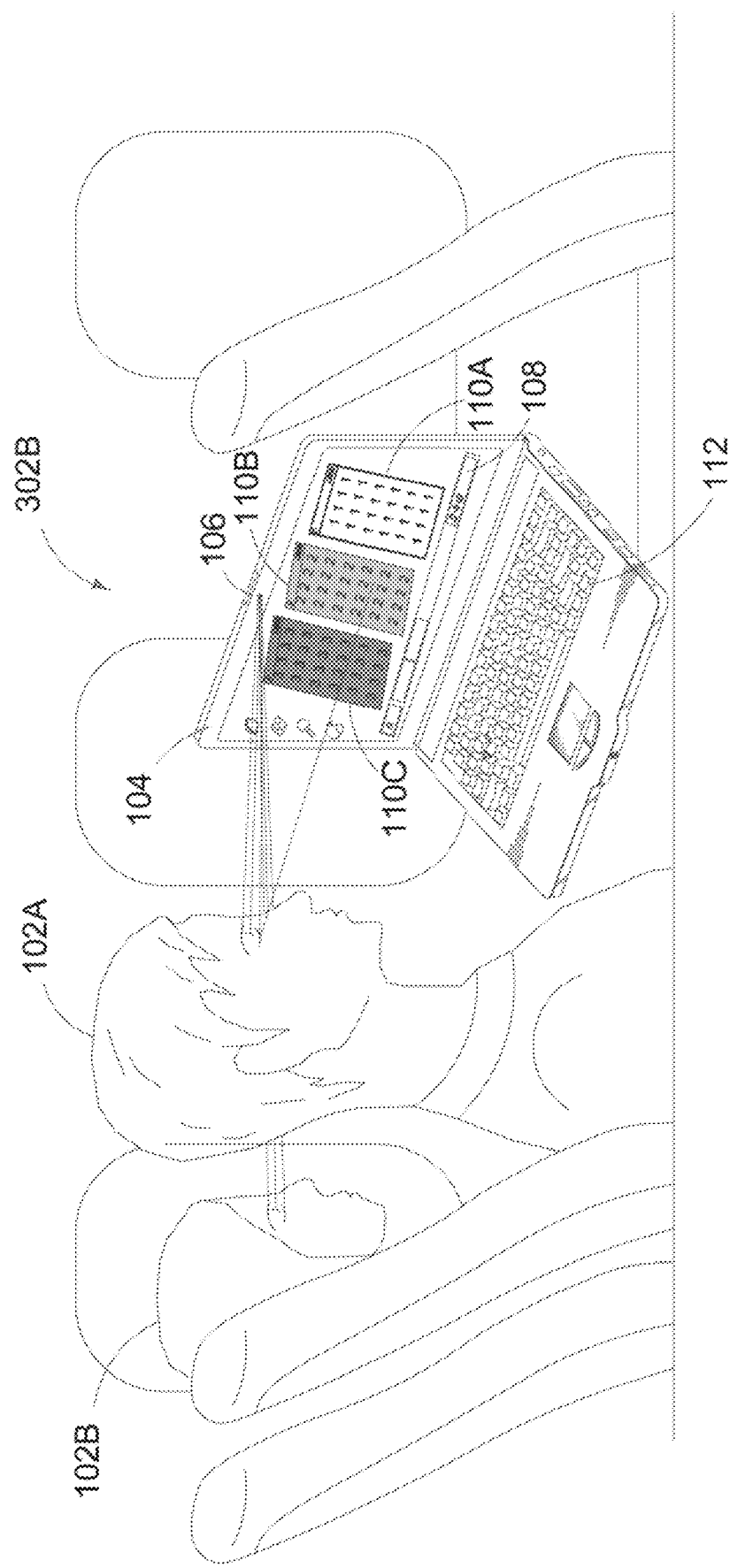

FIGS. 3A-B illustrate a device for adjusting display illumination and privacy based on eye gaze and the location of the display, according to an example of the present disclosure.

In the example of FIG. 3A, user 102A is in an office or private or semi-private environment, with user 102B behind and to the left. According to one example, the user 102A may elect to have a lower privacy mode or threshold selected if the display 104 is in determined to be in a private or semi-private environment, such as an office environment.

In various examples, the location of display 104, or a device housing a display 104 such as a laptop or mobile device, may be determined either by manual user input, or an automated detection such as determining user location based on GPS, a connected WiFi network, a token, or other device or method.

In the example of FIG. 3B, user 102A is in a mobile or public environment such as a plane or train. In FIG. 3B, although user 102B is in the same relative position and distance to user 102A and display 104 as in FIG. 3A, the brightness and angle adjustments to taskbar 108 and windows 110A-C have been applied due to the public nature of the display location. Other privacy levels and settings may be used based on display location type, e.g., a setting for when a display is on a home WiFi network, or a setting for when an accelerometer detects movement of a device or display.

Figure 4A:
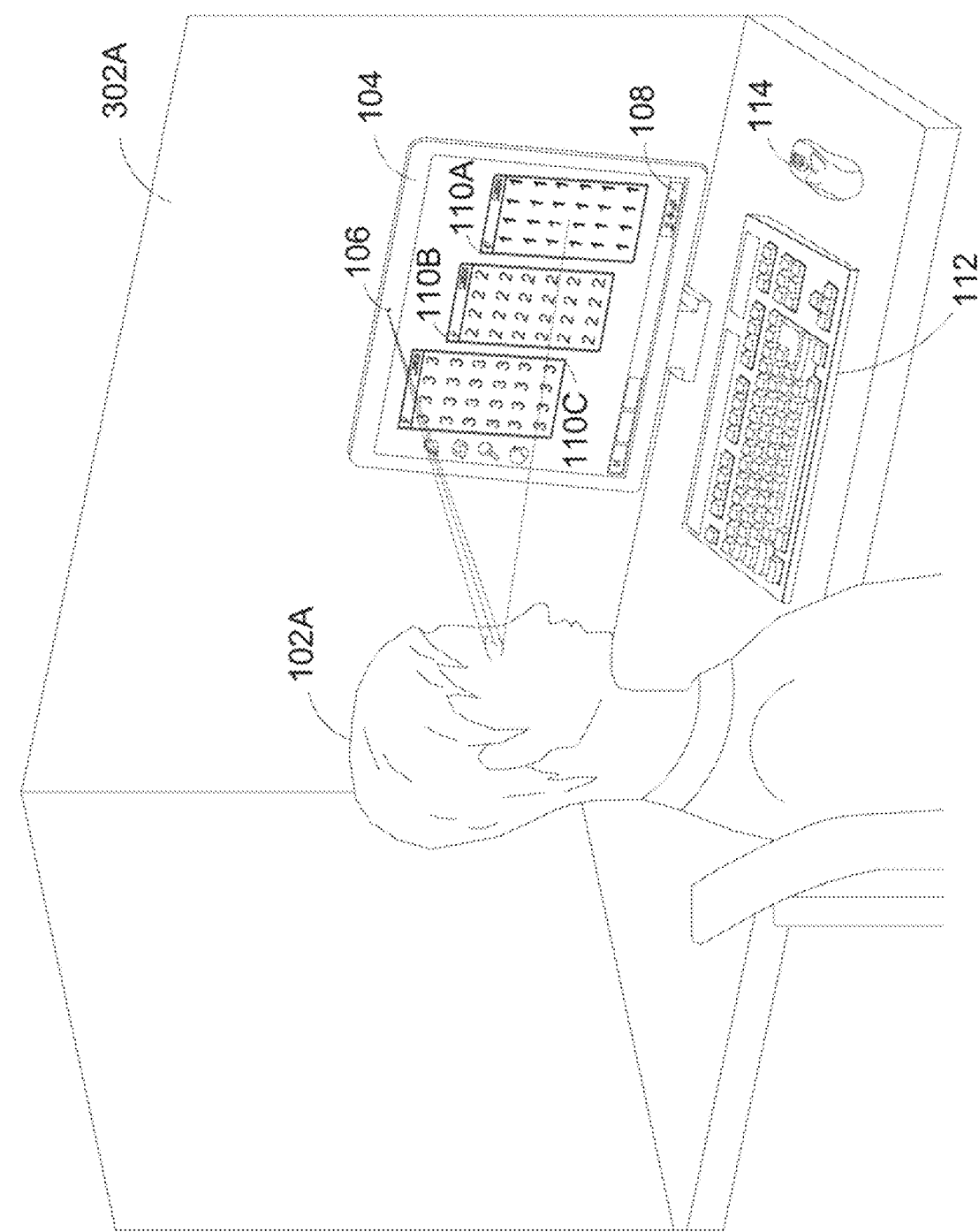
FIGS. 4A-C illustrate a device for adjusting display illumination based on the absence of eye gaze toward the display, according to an example of the present disclosure.
Figure 4B:
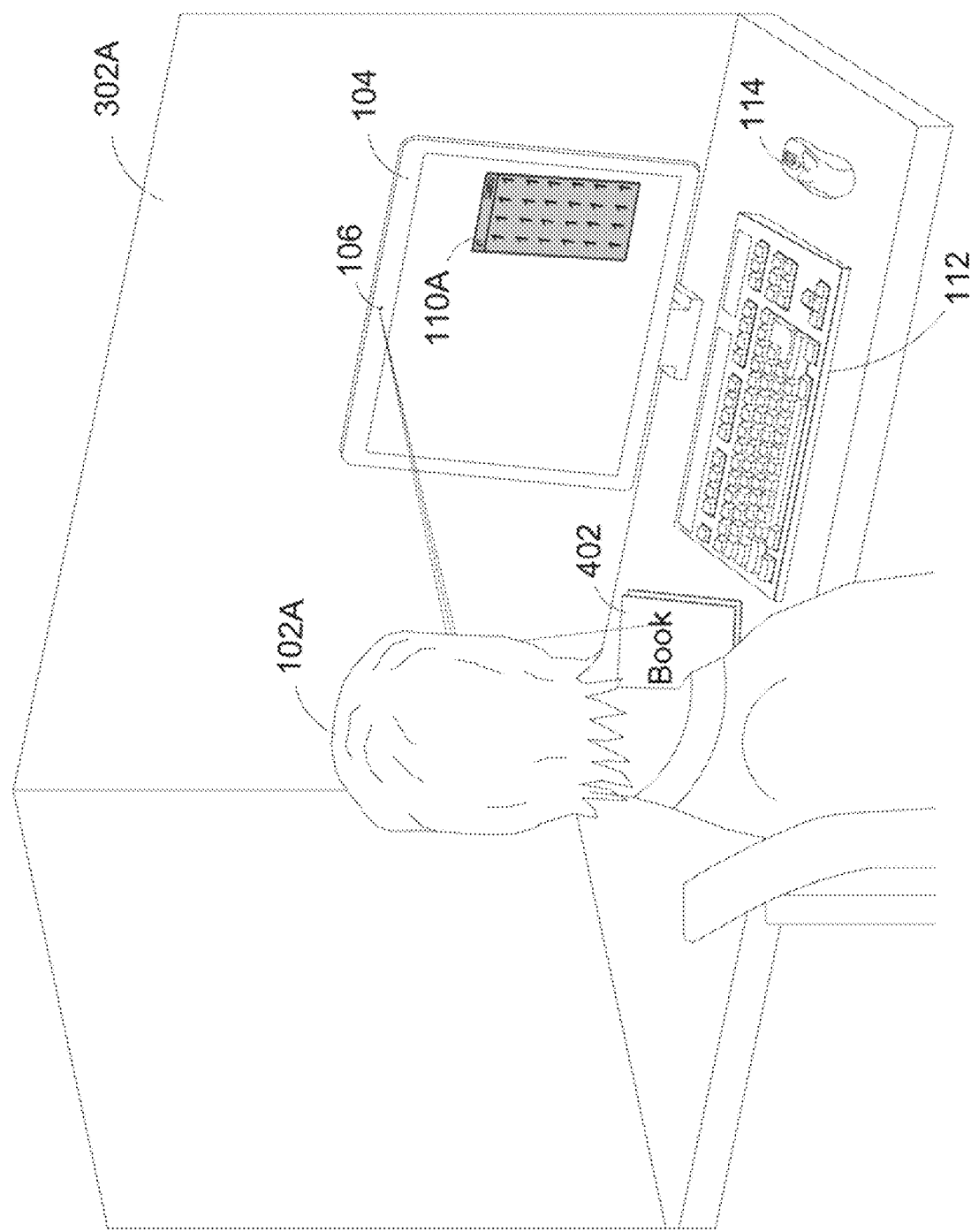
Figure 4C:
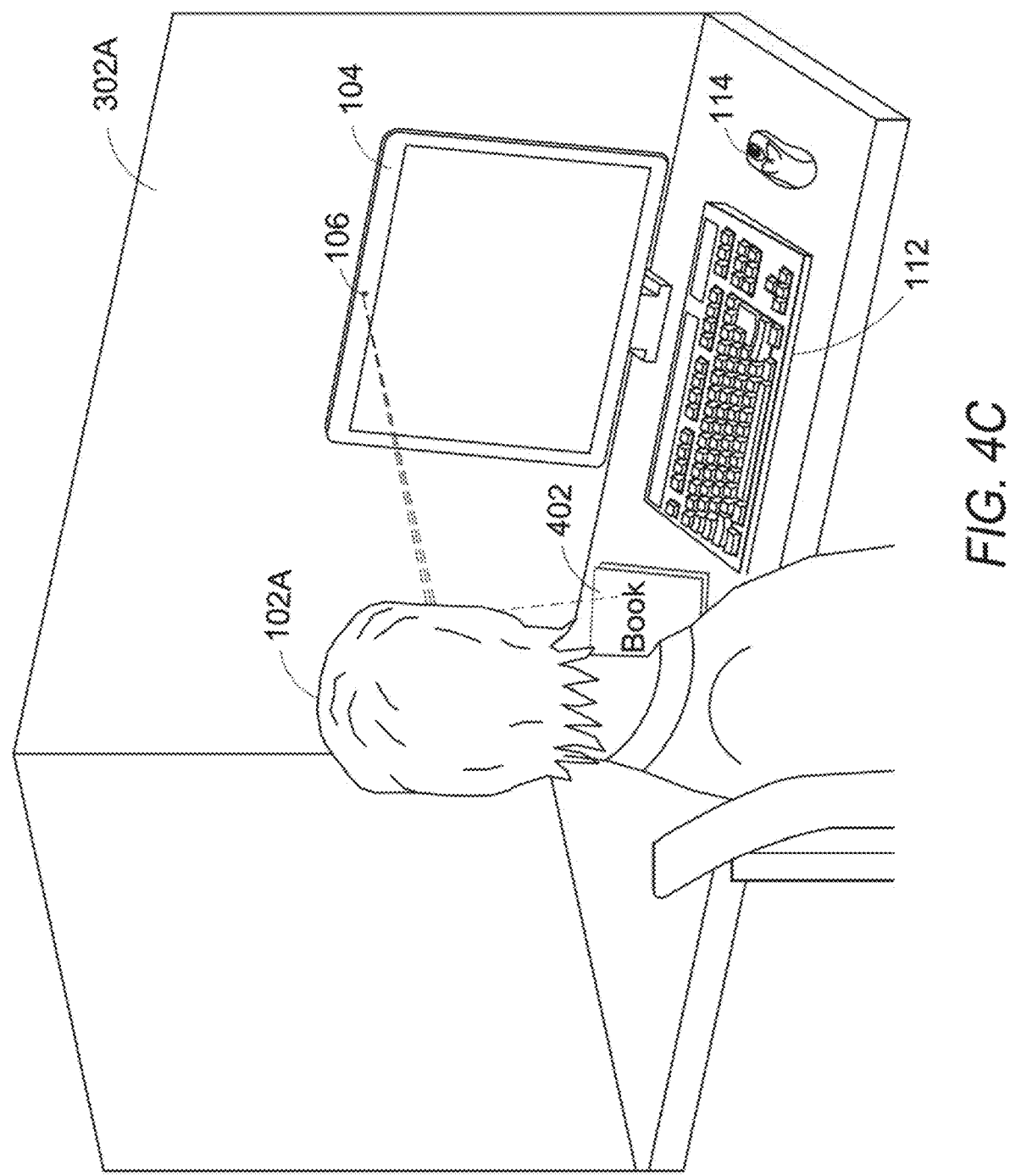

FIGS. 4A-C illustrate a device for adjusting display illumination based on the absence of an eye gaze toward the display, according to an example of the present disclosure. In some examples, the device of FIG. 4A may be a device sensitive to power supply and requirements, or a device configured for power savings.

In FIG. 4A, user 102A is present, and sensor 106 may detect the user's eye gaze on a window, e.g., window 110A. In the example of FIG. 4A, the display remains at normal brightness.

In FIG. 4B, although user 102A is present, sensor 106 may detect that the user's eye gaze is no longer on a window, e.g., window 110A, or other screen area of display 104. For example, user 102A may have looked away from the display to book 402 or other object. In the example of FIG. 4B, all screen areas other than the last active window, e.g., window 110A, have turned off on the display for privacy and power saving.

In FIG. 4C, sensor 106 may have detected that user 102A's eye gaze has remained off the screen, and the display has powered off completely. In various examples, power-saving intervals may be user-configurable or pre-set on a display. For example, the display may be configured to shut off the entire display 5 seconds after the absence of a user eye gaze is detected. In another example, the display may be configured to shut off all areas of the display 10 seconds after the absence of a user eye gaze is detected except for the last active screen area or window, which may be dimmed, and to shut that last active screen area or window off 20 seconds later if the user's eye gaze is not restored to the screen. As discussed above, in some examples, dimming or changes to brightness or illumination in general may be adjusted or relative to ambient lighting in a room or environment.

Figure 5:
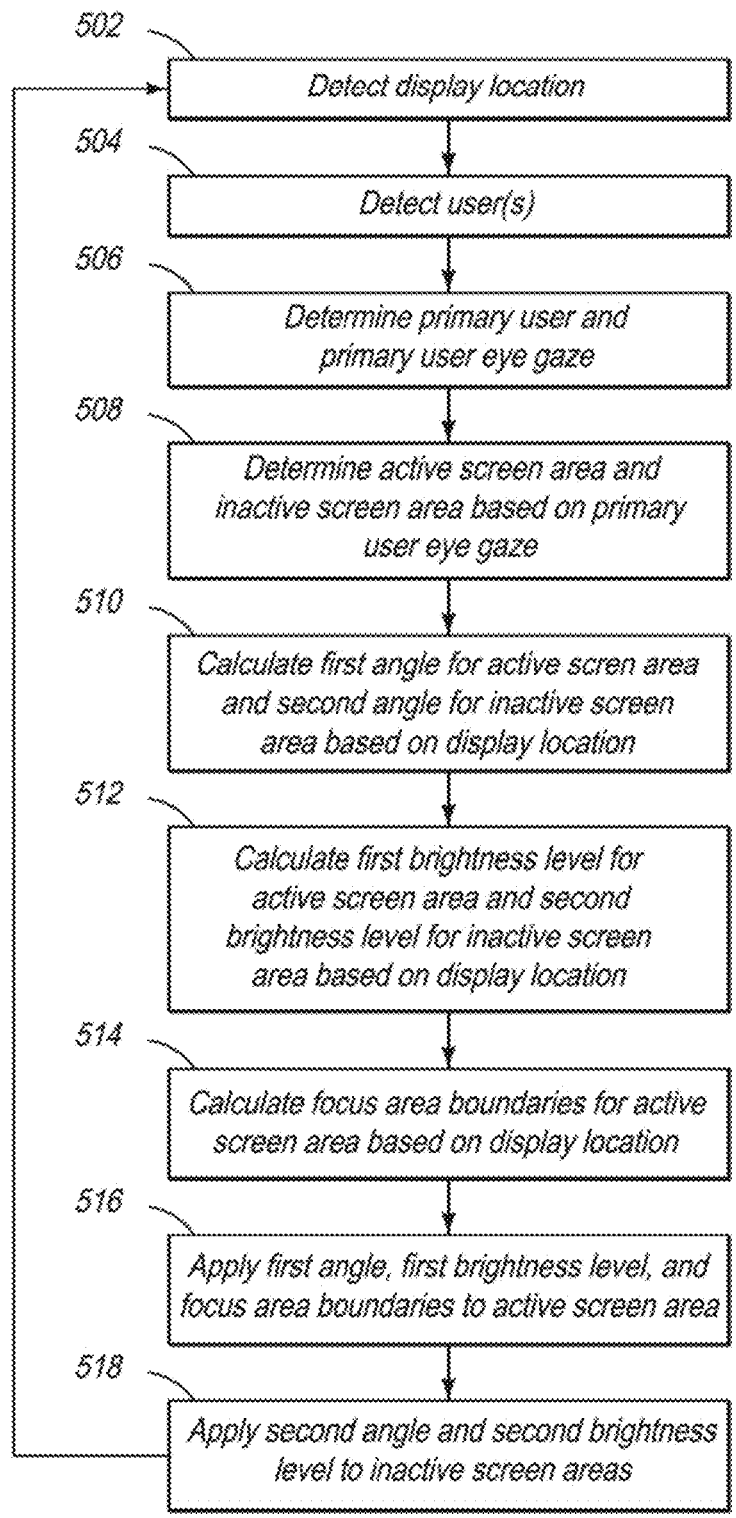
FIG. 5 is a flowchart for adjusting angle, brightness, and focus areas of a display based on display location.

FIG. 5 is a flowchart for adjusting angle, brightness, and focus areas of a display based on display location. In block 502, a display location may be detected, such as by the examples above of user input, GPS, WiFi location sensing, a token, or other factor.

In block 504, a user or users may be detected by a sensor, camera, or other component on a display, such as sensor 106 detected above. In block 506, the primary user and primary user eye gaze may be detected.

In block 508, the active screen area and inactive screen area may be determined based on the primary user's eye gaze.

In block 510, a first angle shift for the active screen area and a second angle shift for the inactive screen area may be determined based on the display location. For example, in a home environment, an angle of 10 degrees may be calculated for active windows, and an angle of 20 degrees may be calculated for inactive windows. In contrast, in a public environment, an angle of 20 degrees may be calculated for active windows, and an angle of 30 degrees may be calculated for inactive windows.

In block 512, a first brightness level for the active screen area and a second brightness level for the inactive screen area may be determined based on the display location. For example, in a home environment, a brightness reduction of 15 percent may be calculated for active windows, and a brightness reduction of 30 percent may be calculated for inactive windows. In contrast, in a public environment, a brightness reduction of 20 percent may be calculated for active windows, and a brightness reduction of 40 percent may be calculated for inactive windows.

In block 514, a focus area or boundaries for a focus area may be calculated, such as in the example of window 110C in FIG. 1C. As discussed above, the focus area may be based on a user setting, a fixed length and width, or a percentage of the device display size.

In block 516, the first angle, first brightness level, and focus area boundaries may be applied to the active screen area, and in block 518, the second angle and second brightness levels may be applied to inactive screen areas. The application of display changes may be carried out through, e.g., Instructions from a processor to a display driver.

Figure 6:
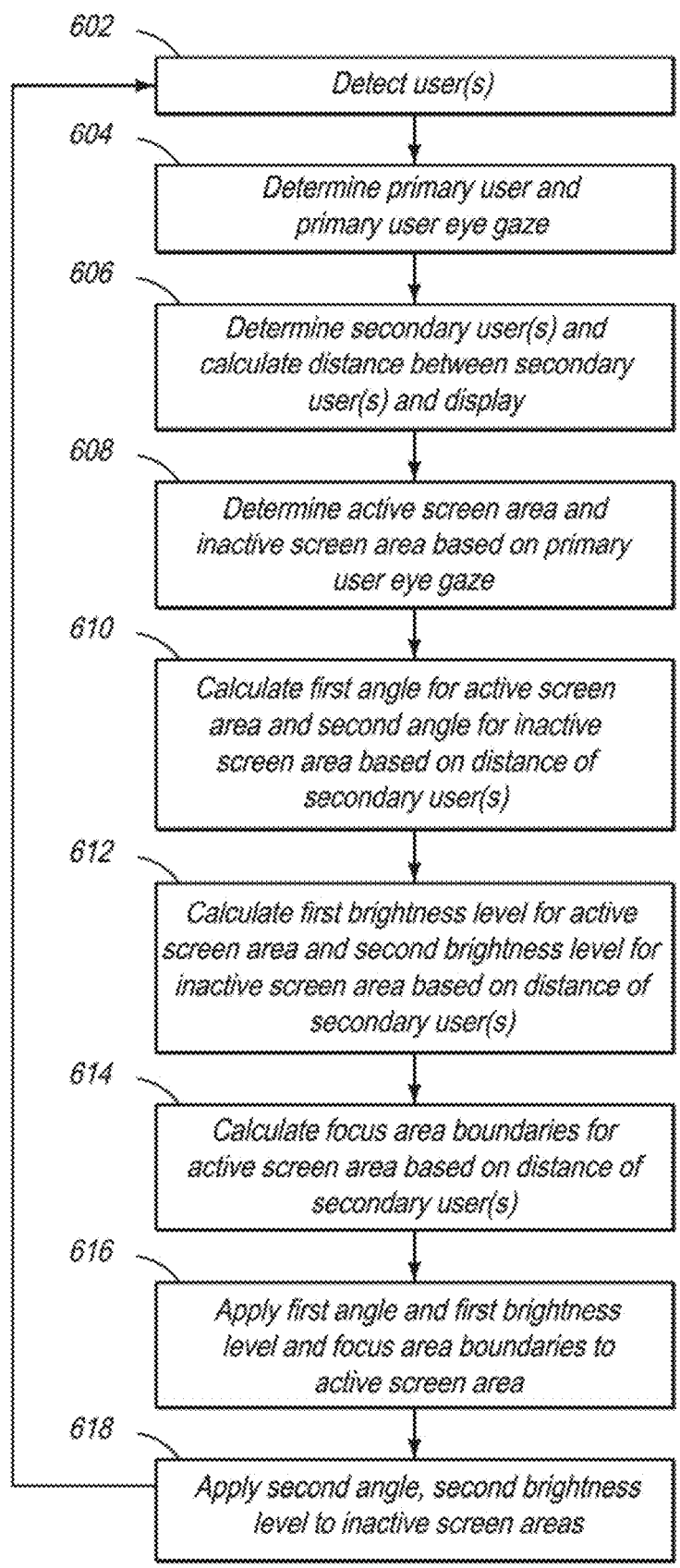
FIG. 6 is a flowchart for adjusting angle, brightness, and focus areas of a display based on the location of a second user.

FIG. 6 is a flowchart for adjusting angle, brightness, and focus areas of a display based on the location or distance of a second user.

In block 602, a user or users may be detected by a sensor, camera, or other component on a display, such as sensor 106 detected above. In block 604, the primary user and primary user eye gaze may be detected.

In block 606, a secondary user or users may be determined and a location of the secondary user or a distance between the secondary user and display 104 may be calculated.

In block 608, the active screen area and inactive screen area may be determined based on the primary user's eye gaze.

In block 610, a first angle shift for the active screen area and a second angle shift for the inactive screen area may be determined based on location or distance of the secondary user. For example, if the secondary user is several feet away from the primary user, an angle of 10 degrees may be calculated for active windows, and an angle of 20 degrees may be calculated for inactive windows. In contrast, if the secondary user is over the shoulder of the primary user, an angle of 20 degrees may be calculated for active windows, and an angle of 30 degrees may be calculated for inactive windows.

In another example, if the secondary user is located to the left of the primary user, the angle shift may be to the right to further impair the ability for the secondary user to be within a usable field of view of the display. In contrast, if the secondary user is to the right of the primary user, the angle shift may be to the left.

In block 612, a first brightness level for the active screen area and a second brightness level for the inactive screen area may be determined based on the location or distance of the secondary user to the display 104. For example, if the secondary user is several feet away from the primary user, a brightness reduction of 15 percent may be calculated for active windows, and a brightness reduction of 30 percent may be calculated for inactive windows. In contrast, if the secondary user is over the shoulder of the primary user, a brightness reduction of 20 percent may be calculated for active windows, and a brightness reduction of 40 percent may be calculated for inactive windows.

In block 614, a focus area or boundaries for a focus area may be calculated, such as in the example of window 110C in FIG. 1C. As discussed above, the focus area may be based on a user setting, a fixed length and width, or a percentage of the device display size, in combination with a distance and/or location of the secondary user to display 104.

In block 616, the first angle, first brightness level, and focus area boundaries may be applied to the active screen area, and in block 618, the second angle and second brightness levels may be applied to inactive screen areas. The application of display changes may be carried out through, e.g., instructions from a processor to a display driver.

Figure 7:
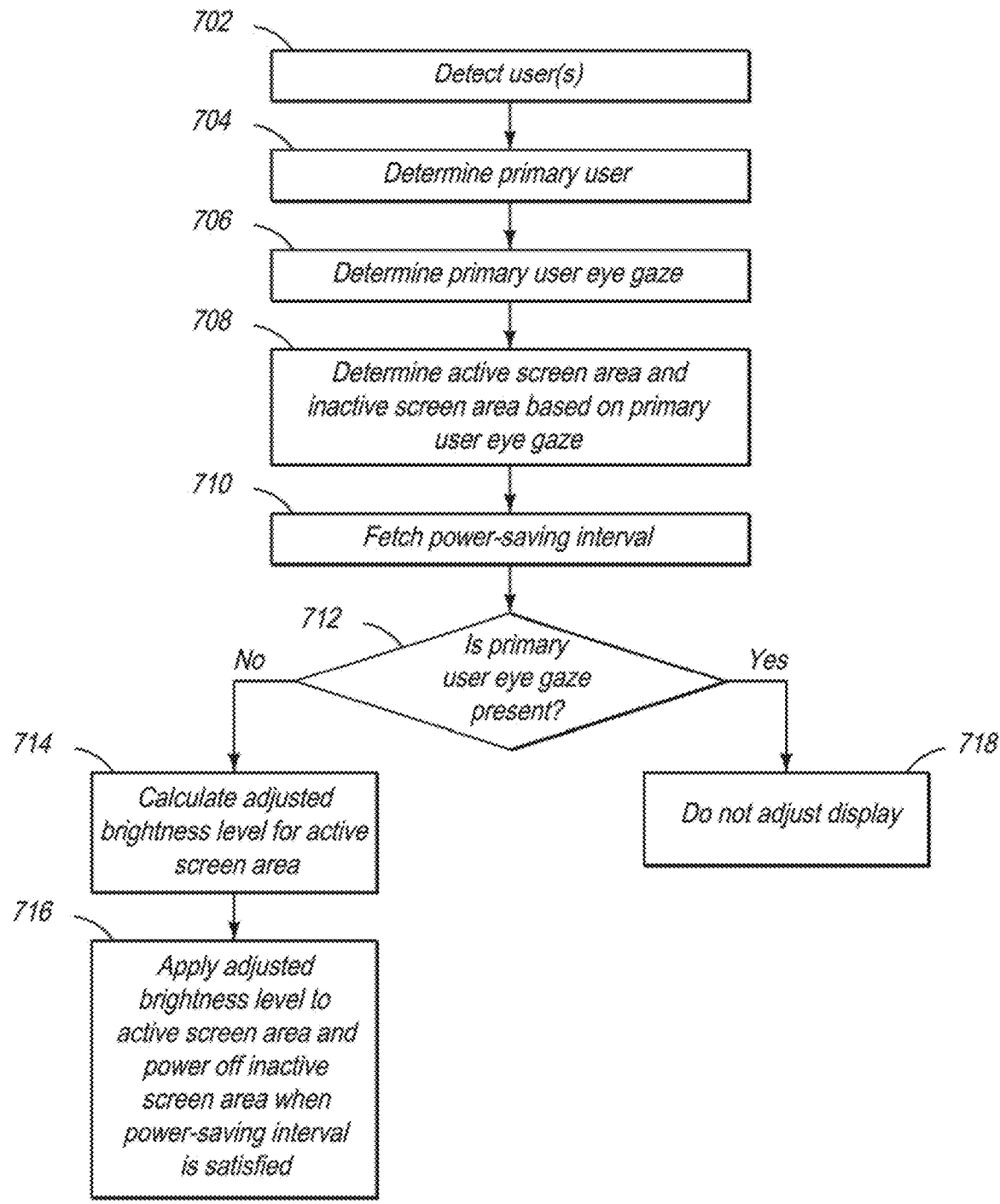
FIG. 7 is a flowchart for adjusting display illumination based on the primary user eye gaze presence.

FIG. 7 is a flowchart for adjusting display illumination based on the primary user eye gaze presence. In block 702, a user or users are detected, and in blocks 704 and 706, the primary user and primary user eye gaze are detected.

In block 708, as discussed above, an active screen area and inactive screen areas are determined based on the primary user's eye gaze.

In block 710, a power saving interval is fetched. As discussed above, for example, the display may be configured to shut off the entire display 5 seconds after the absence of a user eye gaze is detected. In another example, the display may be configured to shut off all areas of the display 10 seconds after the absence of a user eye gaze is detected except for the last active screen area or window, and to shut that last active screen area or window off 20 seconds later if the user's eye gaze is not restored to the screen.

In block 712, a decision is made as to whether the primary user's eye gaze is present. If the eye gaze of the primary user remains present, flow proceeds to block 718 and the display is not adjusted.

If the primary user's eye gaze is not present, flow proceeds to block 714 where an adjusted brightness level for the active screen area is calculated. In some examples, the active screen area may be kept at full brightness, or dimmed, or shut off, or some combination thereof based on a progression of intervals using the methods described above.

In block 716, the adjusted brightness level is applied to the active screen area and the inactive screen areas are turned off. Flow may return to block 702 or 712 such that the system continues to monitor for users and eye gazes.

Figure 8:
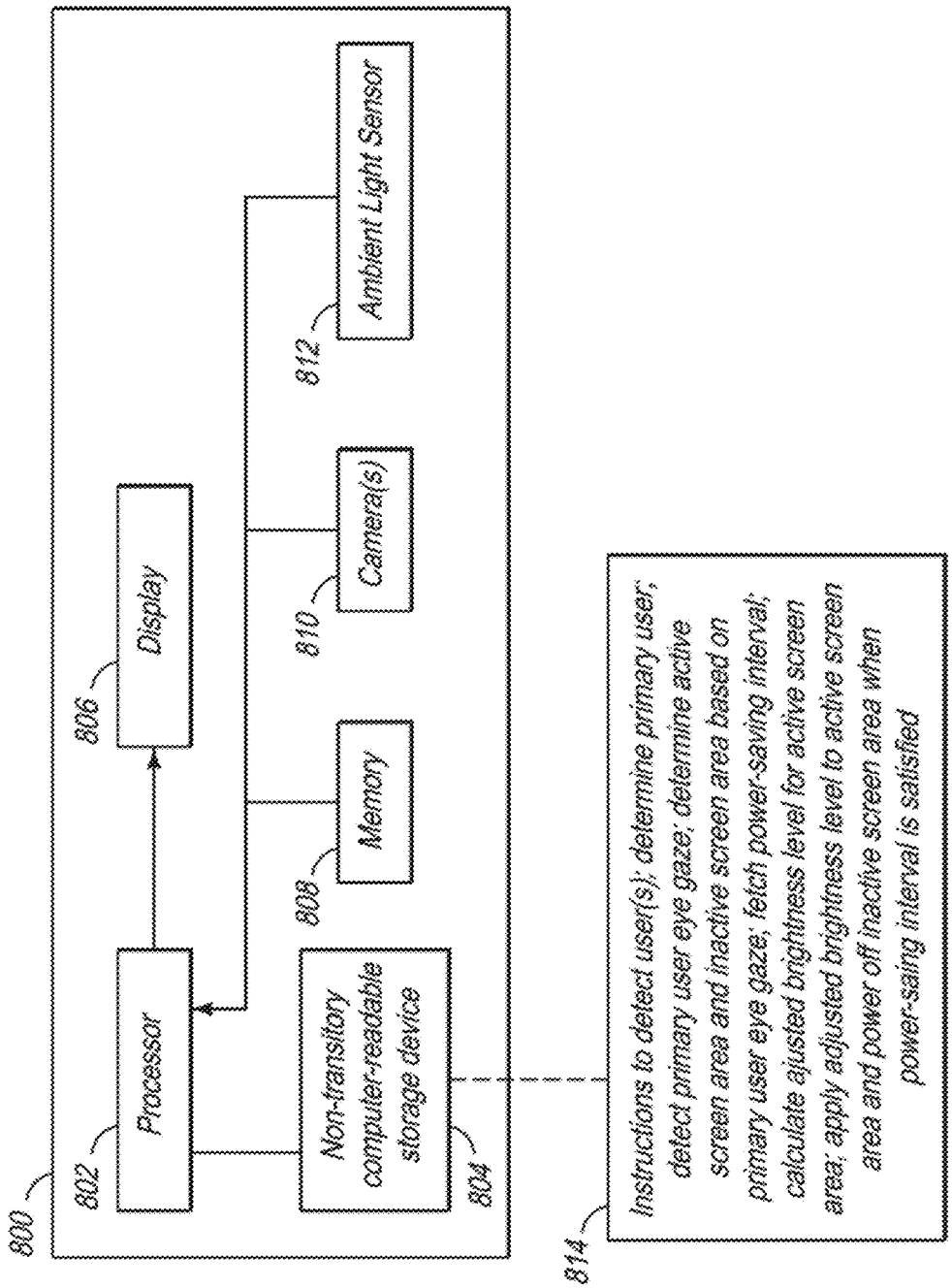
FIG. 8 illustrates a schematic representation of a computing device that may be used as a platform for implementing or executing at least one of the processes depicted in FIGS. 5-7, according to an example of the present disclosure.

FIG. 8 illustrates a schematic representation of a computing device that may be used as a platform for implementing or executing at least one of the processes depicted herein, according to an example of the present disclosure.

In an example, device 800 comprises a processing resource such as processor or CPU 802; a non-transitory computer-readable storage medium 804, a display 806, a memory 808, a camera or other sensor 810, and an ambient light sensor 812. In some examples, device 800 may also comprise a memory resource such as memory, RAM, ROM, or Flash memory; a disk drive such as a hard disk drive or a solid state disk drive; an operating system; and a network interface such as a Local Area Network LAN card, a wireless 802.11x LAN card, a 3G or 4G mobile WAN, or a WiMax WAN card. Each of these components may be operatively coupled to a bus.

Some or all of the operations set forth in the figures may be contained as a utility, program, or subprogram in any desired computer readable storage medium, or embedded on hardware. The computer readable medium may be any suitable medium that participates in providing instructions to the processing resource 802 for execution. For example, the computer readable medium may be non-volatile media, such as an optical or a magnetic disk, or volatile media, such as memory. The computer readable medium may also store other machine-readable instructions, including instructions downloaded from a network or the internet.

In addition, the operations may be embodied by machine-readable instructions. For example, they may exist as machine-readable instructions in source code, object code, executable code, or other formats.

Device 800 may comprise, for example, a computer readable medium that may comprise instructions 814 to receive, from a sensor, detection data associated with at least one user of a display; determine a primary user and a primary user eye gaze; determine an active screen area and an inactive screen area based on the primary user eye gaze; fetch a power-saving interval; and in response to the absence of the primary user eye gaze, calculate an adjusted brightness level for the active screen area and apply the adjusted brightness level to the active screen area, and power off the inactive screen area when the power-saving interval is satisfied.

The computer-readable medium may also store an operating system such as Microsoft Windows, Mac OS, Unix, or Linux; network applications such as network interfaces and/or cloud interfaces; and a cloud broker service, monitoring tool, or metrics tool, for example. The operating system may be multi-user, multiprocessing multitasking, and/or multithreading. The operating system may also perform basic tasks such as recognizing input from input devices, such as a keyboard or a keypad; sending output to a display keeping track of files and directories on a medium; controlling peripheral devices, such as drives, printers, or image capture devices; and/or managing traffic on a bus. The network applications may include various components for establishing and maintaining network connections, such as machine readable instructions for implementing communication protocols including but not limited to, TCP/IP, HTTP, Ethernet, USB, and FireWire.

In certain examples, some or all of the processes performed herein may be integrated into the operating system. In certain examples, the processes may be at least partially implemented in digital electronic circuitry, in computer hardware, in machine readable instructions (such as firmware and/or software), or in any combination thereof.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A system for electronic display illumination, comprising:
    a display;
    a sensor for detecting at least one user and determining a primary user and a primary user eye gaze;
    a processing resource communicatively coupled to the sensor; and
    a computer-readable storage medium on which is stored instructions that when executed by the processing resource, cause the processing resource to:
    detect a location of the display;
    determine an active screen area and an inactive screen area based on the primary user eye gaze;
    calculate, based on the detected location of the display, a first angle of the active screen area to be displayed on the display and a first brightness level for the active screen area and a second angle of the inactive screen area to be displayed on the display and a second brightness level for the inactive screen area; and
    control the display to apply the first angle and the first brightness level to the active screen area, and apply the second angle and the second brightness level to the inactive screen area.

2. The system of claim 1, wherein the instructions are further to cause the processing resource to detect the location of the display based on at least one of a user input, a GPS location, and a WiFi location.

3. The system of claim 2, wherein the instructions are further to cause the processing resource to determine whether the display is in a public space or a private space based on the detected location of the display.

4. The system of claim 1, wherein the first angle and the second angle are applied to a z axis on the display.

5. The system of claim 1, wherein the instructions are further to cause the processing resource to calculate focus area boundaries for the active screen area based on the detected location of the display.

6. The system of claim 5, wherein the instructions are further to cause the processing resource to calculate the focus area boundaries based on a percentage of a size of the display.

7. The system of claim 1, wherein the instructions are further to cause the processing resource to control the display to display the active screen area at the first angle to result in a first perspective display angle and to display the inactive screen area at the second angle to result in a second perspective display angle, the second perspective display angle being different from the first perspective display angle and being to reduce a perceived viewing angle of the inactive screen area.

8. A method of adaptive electronic display illumination, comprising:
    detecting, with a camera coupled to a display, a primary user and a secondary user in proximity to the display;
    determining, by a processor coupled to the camera, the primary user and a primary user eye gaze;
    determining, by the processor, the secondary user and calculating a location of the secondary user relative to the display;
    determining, by the processor, an active screen area and an inactive screen area on the display based on the primary user eye gaze;
    calculating, by the processor, based on the calculated location of the secondary user, a first angle at which the active screen area is to be displayed and a first brightness level for the active screen area and a second angle at which the inactive screen area is to be displayed and a second brightness level for the inactive screen area;

applying the first angle and the first brightness level to the active screen area; and applying the second angle and the second brightness level to the inactive screen area.

9. The method of claim 8, wherein the location of the secondary user further comprises a distance of the secondary user from the display.

10. The method of claim 8, wherein the second angle and the second brightness level are greater than the first angle and the first brightness level.

11. The method of claim 8, further comprising prompting the primary user to share the display and, in the event that the primary user shares the display, reverting at least the active screen area to an original state.

12. The method of claim 8, further comprising calculating focus area boundaries for the active screen area based on the location of the secondary user.

13. The method of claim 12, wherein the focus area boundaries comprise an area of the display unaffected by the application of the first brightness level change.

14. The method of claim 8, wherein applying the first angle to the active screen area includes displaying the active screen area at the first angle to result in a first perspective display angle and displaying the inactive screen area at the second angle to result in a second perspective display angle, the second perspective display angle being different from the first perspective display angle and being to reduce a perceived viewing angle of the inactive screen area.

15. A non-transitory computer readable storage medium on which is stored instructions that, when executed by a processing resource for adjusting electronic display illumination, cause the processing resource to:

receive, from a sensor, detection data associated with a primary user of a display;

determine the primary user and a primary user eye gaze;

determine an active screen area and an inactive screen area on a display based on the determined primary user eye gaze;

calculate a first angle of the active screen area to be displayed on the display and a first brightness level for the active screen area and a second angle of the inactive screen area to be displayed on the display and a second brightness level for the inactive screen area; and control the display to apply the first angle and the first brightness level to the active screen area and apply the second angle and the second brightness level to the inactive screen area, wherein the active screen area is displayed at the first angle to result in a first perspective display angle and the inactive screen area is displayed at the second angle to result in a second perspective display angle, the second perspective display angle being different from the first perspective display angle.

16. The computer readable storage medium of claim 15, wherein the instructions are further to cause the processing resource to:

fetch a power-saving interval;

in response to a determination that the primary user eye gaze is absent, calculate an adjusted brightness level for the active screen area and apply the adjusted brightness level to the active screen area when the power-saving interval is satisfied, and power off the inactive screen area when the power-saving interval is satisfied, and wherein the brightness level calculation is based on an ambient lighting measurement.

17. The computer readable storage medium of claim 16, wherein the power-saving interval is adjustable for the active screen area and the inactive screen area.

18. The computer readable storage medium of claim 16, wherein the adjusted brightness level for the active screen area is sufficient to reduce power consumption of the display.

19. The computer readable storage medium of claim 15, wherein the instructions are further to cause the processing resource to power off the active screen area in response to a determination that the primary user eye gaze is absent during a power-saving interval.

20. The computer readable storage medium of claim 15, wherein the second perspective display angle is to reduce a perceived viewing angle of the inactive screen area.

* * * * *